Dec. 23, 1952  W. A. ENDTER  2,622,906
LATCH BOLT STRUCTURE
Filed May 19, 1949  2 SHEETS—SHEET 1
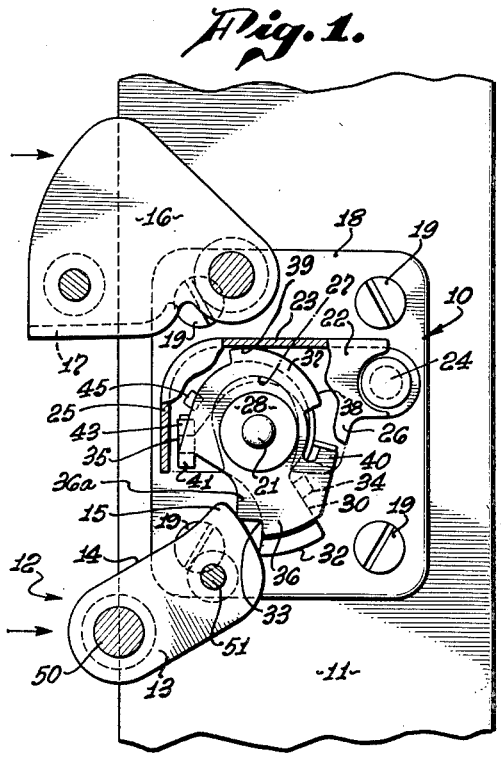
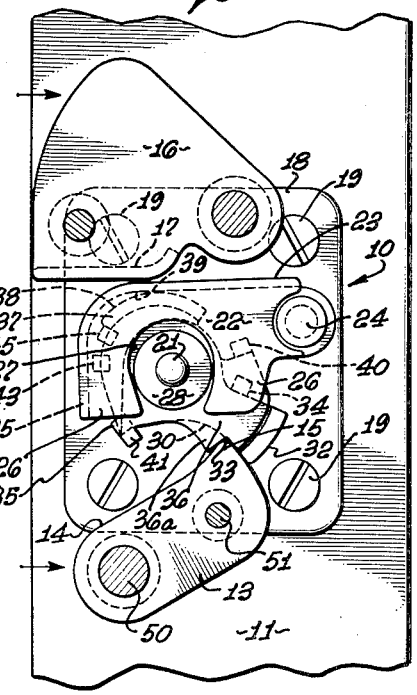
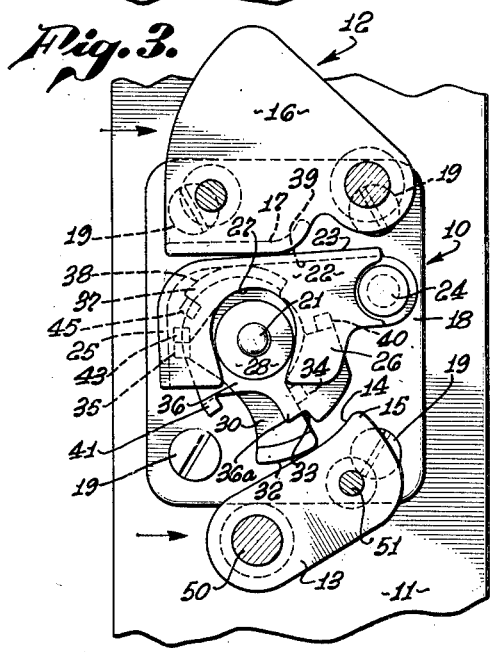
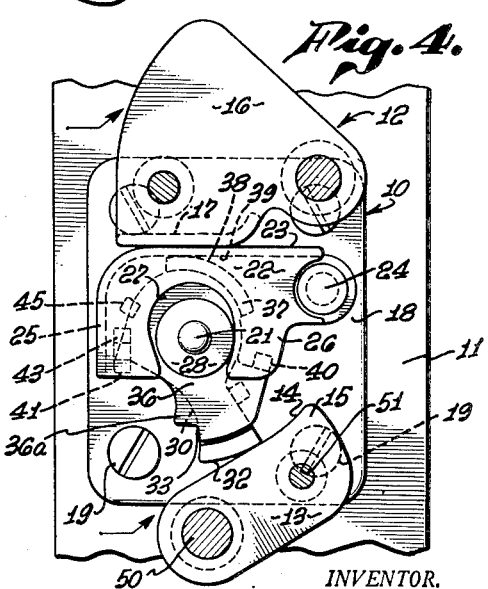
INVENTOR.
WALDEMAR A. ENDTER,
BY
ATTORNEY.

Dec. 23, 1952 W. A. ENDTER 2,622,906
LATCH BOLT STRUCTURE
Filed May 19, 1949 2 SHEETS—SHEET 2
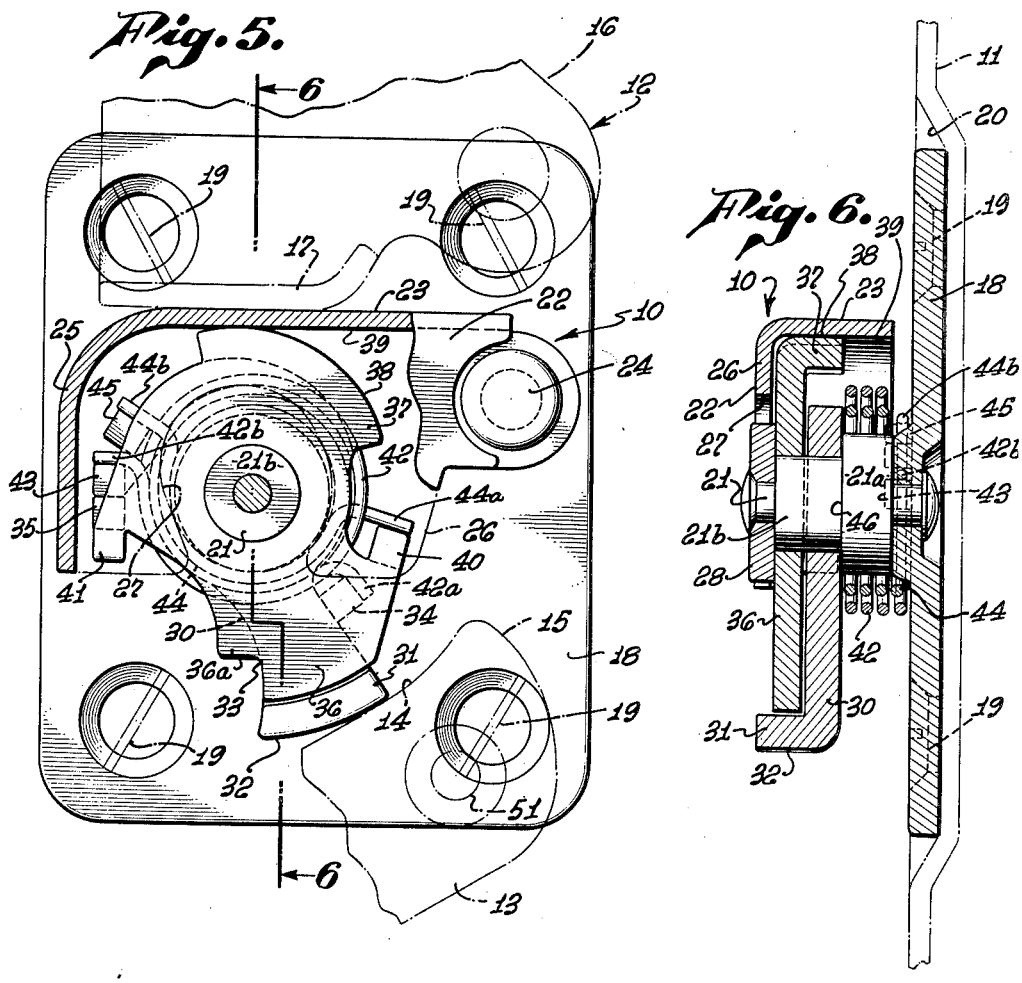
INVENTOR.
WALDEMAR A. ENDTER,
BY
ATTORNEY.

Patented Dec. 23, 1952

2,622,906

UNITED STATES PATENT OFFICE 2,622,906

LATCH BOLT STRUCTURE

Waldemar A. Endter, Long Beach, Calif.

Application May 19, 1949, Serial No. 94,238

15 Claims. (Cl. 292—44)

This invention relates generally to latch mechanisms for releasably securing a movable member such as a door, to a stationary member or frame. Merely as illustrative, and because of its particular characteristics and adaptability, the invention will be described as embodied in an automobile door latching device.

Generally speaking, the invention is primarily concerned with developments in take-up latch mechanisms employing a bolt portion or assembly receivable in essentially dove-tail relation between spaced keeper parts. Specifically contemplated is a bolt device receivable between spaced keeper parts and embodying a movable bolt engageable against a surface of one of the keeper parts opposed to a shoulder formed by the other keeper part, with the bolt device movably engaged against said shoulder to effect a take-up action tending constantly to urge the door to tightly closed condition.

One of my major objects is to incorporate in the latch device a cam action which under the influence of spring actuation, urges the device against both keeper parts and by way of surfaces moving against the keeper faces in a manner productive of the indicated take-up action. More specifically contemplated in the present application is the combination of a bolt mounted for swinging engagement with and along an angular surface of one of the keeper parts, and a relatively movable member which is thrust against the other keeper part and in a direction mainly normal to its surface.

While the invention may take various specific forms it will be given illustrative treatment herein as embodied in a bolt assembly employing three principal parts, namely, the bolt proper which engages one keeper part, a movable element or housing member engageable against the other keeper part, and a cam in effect interposed between the bolt (or its support) and the housing member and acting to thrust the latter against its associated keeper surface.

As will appear, the reaction to the cam-created thrust occurs through the bolt and in a manner tending to urge the bolt in a take-up kind of action against the angular or inclined keeper surface. Although the bolt may constitute a rigid and strut-like element and may have a fixed pivotal mounting, the indicated cam action and bolt thrust against the inclined keeper surface occurs by reason of the inherent and recognized looseness or yieldability in the usual automobile door mountings or hinges, which exists to a degree permitting that amount of bodily displacement of the bolt by the cam effect, to produce the take-up action.

All the features and objects of the invention will be understood most readily and to best advantage without necessity for further preliminary discussion, from the following detailed description of the typical embodiment shown by the accompanying drawings, in which:

Fig. 1 is a general view showing the keeper and bolt assembly, with the keeper assembly advanced just to the point of engagement with the bolt;

Fig. 2 is a similar view illustrating the bolt assembly in its safety catch position;

Figs. 3 and 4 similarly illustrate progressively advanced latched positions of the bolt assembly between the keeper parts;

Fig. 5 is an enlarged view showing the bolt assembly between the keeper parts, in the Fig. 4 position;

Fig. 6 is a cross section on line 6—6 of Fig. 5; and

Figs. 7 and 8 are perspective views showing respectively the cam and bolt.

The invention may be characterized as comprising a bolt assembly, generally indicated at 10, adapted to be carried by a member such as stationary door frame or pillar 11, for latched association with a keeper assembly, generally designated at 12, adapted to be carried by a relatively movable member such as a door (not shown), the keeper-carrying edge of which swings into and out of opposed relation to the face of the pillar 11. It is to be understood that the invention contemplates the use of any appropriate keeper structure employing spaced keeper parts having essentially the later described association with the bolt assembly 10. Merely as illustrative, I have shown the keeper assembly 12 as being the type disclosed in my copending application on "Door Latching Mechanism", Ser. No. 89,173, filed April 23, 1949, which comprises a lower part 13 presenting an inclined bolt engaging surface 14 together with an upper safety catch nose 15, and a vertically spaced upper keeper part 16, the bottom portion 17 of which presents a bearing shoulder engageable by the top element or housing member of the bout assembly so that the latter is confineable between the keeper parts in a dovetail relation. Various incidents of the keeper assembly, such as the mounting of its parts for relative movement together to the illustrated bolt confining positions, and their relative moveability apart to bolt releasing position, are developed in detail in the said copending application, but need not be illustrated or discussed for the purposes of the present invention.

Referring particularly to Figs. 5 and 6, the bolt assembly 10 is shown to be carried by a base plate 18 secured by screws 19 within recess 20 in the face of the pillar 11. Plate 18 carries a shaft 21 having intermediate enlarged diameter portions 21a and 21b. A housing member 22, the top surface 23 of which is engageable against the keeper shoulder 17, is pivotally mounted at 24 on the plate 18 for vertical oscillatory movement in effecting the later described take-up action. The housing 22 is open at its rear, adjacent plate 18, and has downwardly extending end and front sides 25 and 26, the latter containing an opening 27 occupied by the shaft-carried washer 28 and having clearance therefrom within the range of oscillatory movement of the housing.

Bolt 30 rotatably carried on section 21b of the shaft, is extended downwardly to a turned flange portion presenting a curved bearing surface 32 engageable against the inclined face 14 of the lower keeper part 13. The cam is recessed or notched at 33 to provide a safety catch recess which is entered by the keeper nose 15 to retain the parts in safety catch position of Fig. 2. As best illustrated in Fig. 8, the bolt 30 has at one side a spring-engaged shoulder or lug 34 and at its opposite side a second lug 35.

Carried on the shaft section 21b adjacent and at the outside of the bolt is a cam 36, the rotative center of which is at the axis of the shaft 21. The top portion of the cam has the form of an integral flange 37 presenting a bearing face 38 engageable against the under surface 39 of the top wall of the housing 22, surface 38 curving eccentrically with relation to the center of rotation of the cam and at progressively increasing radii counter-clockwise of the cam as viewed in Fig. 5. As shown in Fig. 7, the cam has at one side a spring engaged lug 40 and at its opposite side a lug or finger 41 engageable against the bolt-carried lug 35.

Anti-latching rotation of the bolt from the Fig. 5 position is resisted by a coil spring 42 surrounding the shaft enlargement 21a, one end 42a of the spring bearing against the bolt lug 34, and the opposite end 42b of the spring bearing against a suitable stationary support 43. Similarly, anti-latching rotation of the cam is resisted by a second coil spring 44 contained inside spring 42 and having its one end 44a engaged against the cam-carried lug 45, and its opposite end 44b bearing against the support 45. As illustrated in Fig. 6, the bottom bearing flange 31 of the bolt underlies the lower extent of the cam 36, and the cam and bolt are confined on the shaft between shoulder 46 and the retaining washer 28.

In considering the operation of the invention, assume that the door-carried keeper assembly to have moved toward the bolt assembly to an initial position as illustrated in Fig. 1 wherein the bolt 30 is in the path of the keeper part 13. Upon further advancement of the keeper assembly to the Fig. 2 position, the bolt and cam are rotated in an anti-latching direction by engagement with the end of the keeper part 13, to the point at which the cam portion 36a overrides the keeper nose 15 and then snaps down, under the influence of spring 44 to the illustrated safety catch position. Here the upper keeper shoulder 17 is shown to be advancing into overlying relation to the top surface 23 of the pivoted housing member 22.

Upon further advancement of the keeper parts the bolt is rotated counter-clockwise to override the cam nose 15, and the cam is rotatably carried with the bolt by engagement of the bolt-carried lug 35 against the cam lug 41. Upon reaching the high point of the keeper nose 15, the bolt is rotatably thrust in a clockwise or latching direction ahead of the cam rotation, under the influence of the bolt urging spring 42. Bearing surface 32 of the bolt thus is rotated down along and against the inclined keeper face 14. Coincidentally with and following the bolt rotation, spring 44 acts to rotate the cam in a clockwise direction and to thrust its eccentric bearing surface 38 against the under surface 39 of the housing member. The effect of the cam thus is to present the housing member against the stationarily held keeper bearing shoulder 17 and to create between the upper keeper part and the inclined face 14 of the lower keeper part (through the intermediary of the housing 22, cam 36 and bolt 30) an expansively urged strut effect tending by virtue of the reaction to the bolt thrust against the inclined surface 14, to crowd the door which carries the keeper parts, to its full home or closed position. The result is a door-crowding take-up action, the range of which may be determined in accordance with such considerations as the radial variance or eccentricity of the cam surface 38.

Reference may be had to my copending application referred to above concerning the drop-down releasability of the lower keeper part 13 to permit the keeper assembly to be withdrawn from the Fig. 4 latched association with the bolt assembly. For present purposes it will suffice to indicate that by swinging the lower keeper part 13 about its pivot 50 by way of a pivoted control 51, the keeper is permitted to clear the bolt as the door is opened.

I claim:

1. In an automobile door latch mechanism, the combination comprising a bolt assembly, a pair of spaced keeper parts adapted to receive between them and releasably retain said bolt assembly in dove-tail latched relation, said bolt assembly comprising a movable bolt engageable against one keeper part and a movable member engageable against the other keeper part, rotatable means operable by its rotation in one direction to urge said bolt and member against the keeper parts, a spring tending constantly to rotate said rotatable means in said direction when the mechanism is in latched condition, and a base member carrying both said bolt assembly and rotatable means.

2. In an automobile door latch mechanism, the combination comprising a bolt assembly, a pair of spaced keeper parts adapted to receive between them and releasably retain said bolt assembly in dove-tail latched relation, said bolt assembly comprising a movable bolt engageable against one keeper part and a movable member engageable against the other keeper part, means mounting the bolt for swinging movement, rotatable means operable by its rotation in one direction to urge said bolt and member against the keeper parts, a spring tending constantly to rotate said rotatable means in said direction when the mechanism is in latched condition, and a base member carrying both said bolt assembly and rotatable means.

3. In an automobile door latch mechanism, the combination comprising a bolt assembly, a pair of spaced keeper parts adapted to receive between them and releasably retain said bolt assembly in dove-tail latched relation, said bolt assembly comprising a movable bolt engageable against one keeper part and a movable member engageable against the other keeper part, means mounting said member for pivotal movement, rotatable means operable by its rotation in one direction to urge said bolt and member against the keeper parts, a spring tending constantly to rotate said rotatable means in said direction when the mechanism is in latched condition, and a base member carrying both said bolt assembly and rotatable means.

4. In an automobile door latch mechanism, the combination comprising a bolt assembly, a pair of spaced keeper parts adapted to receive between them and releasably retain said bolt assembly in dove-tail latched relation, said bolt assembly comprising a rotatable bolt engageable against one keeper part and a pivotally movable member engageable against the other keeper part, rotatable means operable by its rotation in one direction to urge said bolt and member against the keeper parts, a spring tending constantly to rotate said rotatable means in said direction when the mechanism is in latched condition, and a base member carrying both said bolt assembly and rotatable means.

5. In an automobile door latch mechanism, the combination comprising a bolt assembly, a pair of spaced keeper parts adapted to receive between them and releasably retain said bolt assembly in dove-tail latched relation, said bolt assembly comprising a movable bolt engageable against one keeper part and a movable member engageable against the other keeper part, a rotatable cam interposed between said bolt and member and operable by virtue of its rotation in one direction to urge the bolt and member against said keeper parts, a spring tending constantly to rotate the cam in said direction when the mechanism is in latched condition, and a base member carrying both said cam and bolt assembly.

6. In an automobile door latch mechanism, the combination comprising a bolt assembly, a pair of spaced keeper parts adapted to receive between them and releasably retain said bolt assembly in dove-tail latched relation, said bolt assembly comprising a rotatable bolt engageable against one keeper part and a pivotally movable member engageable against the other keeper part, a cam interposed between said bolt and member and rotatable about the axis of rotation of the bolt to urge the bolt and cam against said keeper parts, and a base member carrying both said cam and bolt assembly.

7. In an automobile door latch mechanism, the combination comprising a bolt assembly, a pair of spaced keeper parts adapted to receive between them and releasably retain said bolt assembly in dove-tail latched relation, said bolt assembly comprising a movable bolt engageable against one keeper part and a movable member engageable against the other keeper part, a rotatable cam interposed between said bolt and member, a spring rotatably urging said cam to press said bolt and member against the keeper parts in the latched condition of the mechanism, and a base member carrying both said cam and bolt assembly.

8. In an automobile door latch mechanism, the combination comprising a bolt assembly, a pair of spaced keeper parts adapted to receive between them and releasably retain said bolt assembly in dove-tail relation, said bolt assembly comprising a shaft, a bolt rotatable about said shaft and engageable against one keeper part and a movable member engageable against the other keeper part, a cam interposed between said bolt and member and rotatable about said shaft, a coil spring encircling said shaft and urging said cam to press said bolt and member against the keeper parts, a second coil spring encircling said shaft and resisting anti-latching movement of the bolt, and a base member carrying both said cam and bolt assembly.

9. In an automobile door latch mechanism a bolt assembly comprising a vertically movable member engageable against the underside of an upper keeper part, a movable bolt below said member and engageable against a lower keeper part, a rotatable cam interposed between said bolt and member, a spring tending to rotate the cam and thereby urge the bolt and member against the keeper parts, a shaft about which said member, bolt and cam are rotatable, and a base member carrying said shaft.

10. In an automobile door latch mechanism a bolt assembly comprising a vertically movable member engageable against the underside of an upper keeper part, a rotatable bolt below said member and engageable against a lower keeper part, and a cam interposed between said bolt and member and rotatable about the bolt to urge said member and bolt against the keeper parts, a spring for rotating said cam and a second spring resisting anti-latching rotation of the bolt, said bolt and cam being rotatable about a common axis.

11. In an automobile door latch mechanism a bolt assembly comprising a pivotally vertically movable member engageable against the underside of an upper keeper part, a pivotally movable bolt below said member and engageable against a lower keeper part, a cam interposed between said bolt and member, and a spring tending to rotate the cam and thereby urge the bolt and member against the keeper parts in the latched condition of the mechanism.

12. In an automobile door latch mechanism, a bolt assembly comprising a housing plate, a bearing member pivotally mounted on said plate and engageable against the underside of an upper keeper part, a rotatable bolt below said member and engageable against a lower keeper part, a cam contained within said member and rotatable in one direction about the axis of rotation of the bolt to urge said member and bolt against the keeper parts, a spring tending to constantly rotate the cam in said direction when the mechanism is in latched condition, and a second spring resisting anti-latching rotation of the bolt.

13. In an automobile door latch mechanism, a bolt assembly comprising a housing plate, a bearing member pivotally mounted on said plate and engageable against the underside of an upper keeper part, a pivotally movable bolt below said member and engageable against a lower keeper part, a cam contained within said member having a portion projecting into the plane of the bolt and rotatable about one edge of the bolt to urge said member and bolt against the keeper parts, a coil spring tending to constantly rotate the cam in said direction when the mechanism is in latched condition, and a second coil spring resisting anti-latching rotation of the bolt, one of said springs being contained within the other.

14. In an automobile door latch mechanism, a bolt assembly comprising a housing plate, a bearing member pivotally mounted on said plate and engageable against the underside of an upper keeper part, a shaft carried by said plate, a bolt rotatable about said shaft below said member and engageable against a lower keeper part, and a cam interposed between said bolt and member and rotatable on said shaft to urge the bolt and member against the keeper parts.

15. In an automobile door latch mechanism a bolt assembly comprising a pivotally vertically movable member engageable against the underside of an upper keeper part, a rotatable bolt below said member and engageable against a lower keeper part, a cam interposed between said bolt and member and rotatable to urge them against the keeper parts, said cam and bolt having releasably engageable shoulders whereby the bolt and cam are rotatable together in one direction, and a spring rotatably urging the cam in an opposite direction.

WALDEMAR A. ENDTER.

REFERENCES CITED

The following references are of record in the file of this patent:

UNITED STATES PATENTS

| Number | Name | Date |
|---|---|---|
| 2,096,980 | Schjolin | Oct. 26, 1937 |
| 2,210,989 | Sutherland | Aug. 13, 1940 |
| 2,215,914 | Coffey | Sept. 24, 1940 |

FOREIGN PATENTS

| Number | Country | Date |
|---|---|---|
| 810,192 | France | Dec. 19, 1936 |